United States Patent [19]

Meisner et al.

[11] Patent Number: 5,061,849
[45] Date of Patent: * Oct. 29, 1991

[54] EXTERNALLY MOUNTED RADIOACTIVITY DETECTOR FOR MWD EMPLOYING RADIAL INLINE SCINTILLATOR AND PHOTOMULTIPLIER TUBE

[75] Inventors: James E. Meisner, Spring; Edward S. Mumby; Vernon E. Groeschel, both of Houston, all of Tex.

[73] Assignee: Baker Hughes Incorporated, Houston, Tex.

[*] Notice: The portion of the term of this patent subsequent to Feb. 27, 2007 has been disclaimed.

[21] Appl. No.: 485,041

[22] Filed: Feb. 26, 1990

Related U.S. Application Data

[63] Continuation-in-part of Ser. No. 177,389, Apr. 1, 1988, Pat. No. 4,904,865.

[51] Int. Cl.⁵ .............................................. G01V 5/08
[52] U.S. Cl. ..................................... 250/254; 250/266
[58] Field of Search ................. 250/254, 264, 265, 266

[56] References Cited

U.S. PATENT DOCUMENTS

4,492,865 1/1985 Murphy et al. ............... 250/254
4,904,865 2/1990 Meisner et al. ............... 250/254

Primary Examiner—Carolyn E. Fields
Attorney, Agent, or Firm—Christie, Parker & Hale

[57] ABSTRACT

Improved radioactivity well logging by mounting a scintillator and photomultiplier tube in a single case interfacing with a hole extending through a drill collar at the lower end of a drill string so that measurements can be made while drilling. Radioactive sources (when required for well logging) are mounted in cavities which open to the exterior of the drill collar. Light from the scintillator is coupled directly to the aligned photomultiplier tube both of which are mounted in a case extending radially within the drill collar and sealingly engaging an electronics housing within the drill collar and the drill collar wall surrounding the hole. The scintillator is of greater diameter than the photomultiplier tube. A frustoconical light pipe connects the scintillator and the photomultiplier tube, channeling scintillation in the crystal to the photomultiplier to provide an amplified detection capability over that for a scintillator having the same diameter as the photomultiplier tube.

14 Claims, 8 Drawing Sheets

EXTERNALLY MOUNTED RADIOACTIVITY DETECTOR FOR MWD EMPLOYING RADIAL INLINE SCINTILLATOR AND PHOTOMULTIPLIER TUBE

CROSS-REFERENCE TO RELATED APPLICATIONS

This is a continuation-in-part of prior U.S. patent application Ser. No. 07/177,389 filed on Apr. 1, 1988, now U.S. Pat. No. 4,904,865, in which an externally mounted radioactivity detector for measuring while drilling was described.

BACKGROUND OF THE INVENTION

1. Field of the Invention

This invention relates to radioactivity well logging during drilling.

2. The Prior Art

It has long been the practice to measure radioactivity (either natural or induced) in formations penetrated by a well. Originally, to conduct such logging operations, drilling was stopped, the drill string removed from the well, and a radioactivity well logging tool run into the well on an electrically conductive cable to measure the radioactivity of formations of interest.

Many prior art patents disclose well logging of natural gamma ray intensity, or induced radioactivity (using either a gamma ray or a neutron source and detecting gamma rays scattered back to the logging instrument from the formation, or detecting neutrons slowed by the formation and scattered back to the logging instrument). For example, U.S. Pat. No. 2,481,014 to Herzog (1949) discloses natural gamma ray logging with a tool lowered into and raised from a well on an electrically conductive cable. U.S. Pat. No. 2,666,146 to Herzog (1950) discloses the use of a neutron source to bombard formations surrounding a well bore with neutrons to cause gamma rays to be emitted from the formation due to nuclear collision of the neutrons with atoms in the formation. U.S. Pat. No. 2,857,522 to Jones (1958) discloses well logging equipment adapted to be lowered into a well from which the drill string has been removed. The Jones well logging equipment discloses detecting beta rays with a scintillator mounted in the sidewall of a logging tool (sonde) adapted to be lowered into and removed from a well from which the drill string has previously been removed.

To avoid the cost of having to stop drilling, withdraw the drill string, enter the well with special well logging equipment, remove the well logging equipment, and re-enter the well bore with the drill string, systems have been developed for logging without removing the drill string. For example, U.S. Pat. No. 4,351,037 to Scherbatskoy (1982) and U.S. Pat. No. 4,216,536 to More (1980) refer to gamma ray well logging with the drill string in the hole, but they do not disclose how to mount the radioactivity sensors in the drill string.

Using radioactivity detectors mounted within the drill string so that natural gamma ray measurements can be made without having to remove the drill string from the well has the advantage of logging formations without first having to remove the drill string from the well. However, logging with such a system is of limited value because mounting the radioactivity sensor within the drill string significantly reduces sensitivity. For example, in natural gamma ray logging, the measured gamma ray intensity with a sensor inside the drill string (i.e., within the thick-walled drill collars at the lower end of the drill string) is only about 10% of that compared with conventional well logging tools where there is no drill collar to shield the natural radioactivity of the formation. The drill collar wall can attenuate neutron flux by a factor of 5. Moreover, mounting the radioactivity sensors within the drill collar makes it difficult to service and replace them in the field.

SUMMARY OF THE INVENTION

This invention provides apparatus with one or more radioactivity detectors, each mounted in a respective hole extending through the wall of a drill collar to minimize the shielding effect of the drill collar. As used herein, "radioactivity" includes gamma rays (natural and induced) and fast, epithermal, and thermal neutrons. Preferably, the radioactivity is detected with a scintillator. The invention also provides apparatus with radioactive sources (when used) mounted in cavities on the exterior of the drill collar to minimize the shielding effects of the drill collar on the radioactive source, whether it is a source of gamma rays or neutrons. With the apparatus of this invention, the sensors and sources can be removed and installed easily and quickly in the field to facilitate servicing and providing a wide range of well logging.

A further advantage of this invention is that for gamma ray-gamma ray logging to determine formation density, or neutron logging to measure formation porosity, the measurement is made before the formation is severely contaminated by intrusion of drilling mud filtrate or obscured by the buildup of drilling mud filter cake on the wall bore wall.

The outer portion of the scintillator mounted in the hole through the drill collar receives gamma rays or neutrons, which are converted into flashes of light that are transmitted inwardly through the scintillator to a photomultiplier tube mounted in direct alignment with the scintillator. The scintillator and photomultiplier tube are mounted in a common case mating with an electronics housing secured to the inside of the drill collar and disposed to permit drilling liquid to flow past it. Thus, light emitted by the scintillator may be detected with the drill string in the well, and even when drilling fluid is flowing through the drill collar.

Preferably, the electronics housing is sealed at atmospheric pressure, and designed to withstand the high hydrostatic pressure encountered in drilling deep wells, say, up to 20,000 psi. The case housing the scintillator and photomultiplier tube is also preferably designed to withstand the same hydrostatic pressure. Moreover, the scintillator case is sealed in the drill collar bore to withstand the drilling fluid differential pressure across the drill collar wall during drilling operations, which can be the order of several thousand psi.

In a preferred form of the invention, the photomultiplier tube is connected in direct alignment with the scintillator crystal through light-coupling means. Both devices are then mounted in a radial direction with respect to the longitudinal axis of the drill collar. The case enclosing the scintillator and photomultiplier tube is fabricated of a sturdy metal (preferably stainless steel) sealed in the drill collar hole and also in a hole through the electronics housing wall. This causes the electronics housing to be urged against the interior of the drill collar wall with a force equal to the pressure of the drilling fluid in the drill collar multiplied by the cross sectional area of the case sealed in the hole of the electronics housing wall. With this arrangement, the case also acts as a load-bearing plug against shear forces between the drill collar and the electronics housing.

The preferred form of the invention also includes a radioactive source mounted in a cavity on the outer surface of the drill collar to provide either gamma rays or neutrons for bombarding the formations to be logged. Preferably, the source and scintillator are on the same side of the drill collar to minimize interference from the drill collar and surrounding drilling fluid and any mud cake on the well bore wall.

In another preferred form of the invention, two scintillator and photomultiplier tube combinations are each mounted in a respective hole extending through the drill collar wall, as described above. The scintillators are spaced from each other in a direction substantially parallel to the longitudinal axis of the drill collar and may measure either the same or different types of radiation returning from the formation. This permits either compensated logs to be taken of the same type of radiation, or simultaneous logging of different types of radioactivity. For example, one scintillator may measure gamma rays, while the other measures neutrons, either thermal or epithermal.

In the preferred embodiment of the invention, as described in detail below, pressure pulses are transmitted through the drilling liquid used in normal drilling operations to send radioactivity well logging data from the vicinity of the drill bit to the surface of the earth. As the well is drilled, at least one downhole radioactivity intensity within the well is sensed, and a signal is generated to represent the sensed condition. The signal is used to alter the flow of drilling liquid in the well to cause pulses at the surface to produce an appropriate signal representing the sensed downhole condition.

DESCRIPTION OF SPECIFIC EMBODIMENTS

Figure 1:
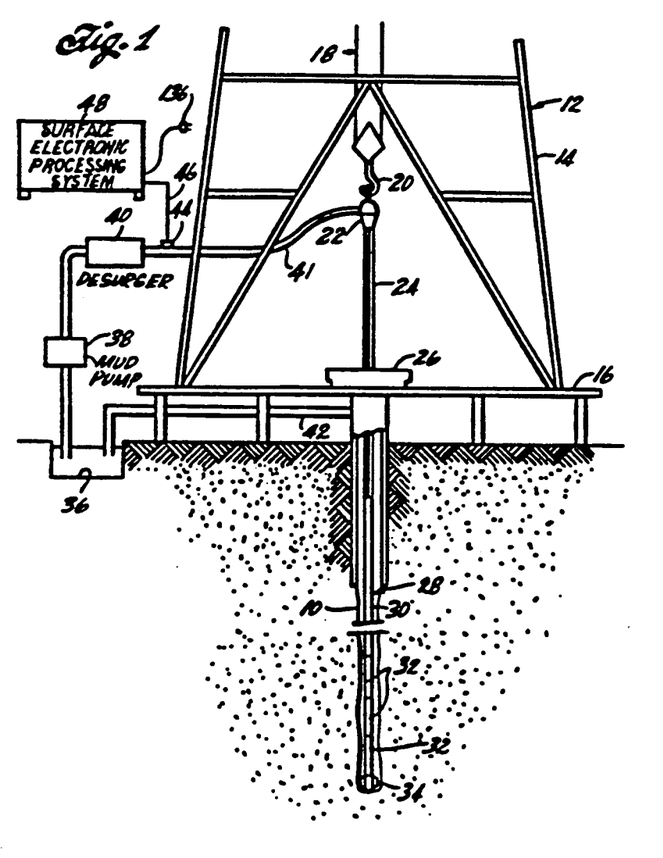
FIG. 1 shows a system for simultaneously drilling and logging a well.

Referring to FIG. 1, a well 10 is drilled in the earth with a rotary drilling rig 12, which includes the usual derrick 14, derrick floor 16, draw works 18, hook 20, swivel 22, kelly joint 24, rotary table 26, and drill string 28 that includes a length of conventional drill pipe sections 30 secured at its upper end to the lower end of the kelly joint 24 and at its lower end to the upper end of a length of drill collars 32, the lower end of which carries a drill bit 34.

Drilling liquid (or mud, as it is commonly called) circulates from a mud pit 36 through a mud pump 38, a desurger 40, a mud supply line 41, and into the swivel 22. The drilling mud flows down through the kelly joint, the drill string, and out through jets (not shown) in the drill bit. The drilling mud flows back up through the annular space between the outer diameter of the drill string and the well bore to the surface, where it returns to the mud pit through mud return line 42. The usual shaker screen for separating formation cuttings from the drilling mud before it returns to the mud pit is not shown.

A transducer 44 mounted in mud supply line 41 detects variations in drilling mud pressure at the surface. The transducer generates electrical signals responsive to drilling mud pressure variations, and these signals are transmitted by an electrical conductor 46 to a surface electronic processing system 48, which may be of the type described in U.S. Pat. No. 4,216,536 to More, and which is incorporated herein by reference to that patent.

Referring to FIGS. 2 and 3A-3C, a logging tool 49 is located within the drill collar nearest the drill bit. The logging tool includes a lower radioactivity source 50 (FIGS. 2 and 3C), an upper radioactivity source 51 and a lower scintillator 52 (FIGS. 2 and 3B), and an upper scintillator 53 (FIGS. 2 and 3A), all spaced from each other in that order from bottom to top, and all lying in a plane which includes the longitudinal axis of the drill collar.

Figure 2:
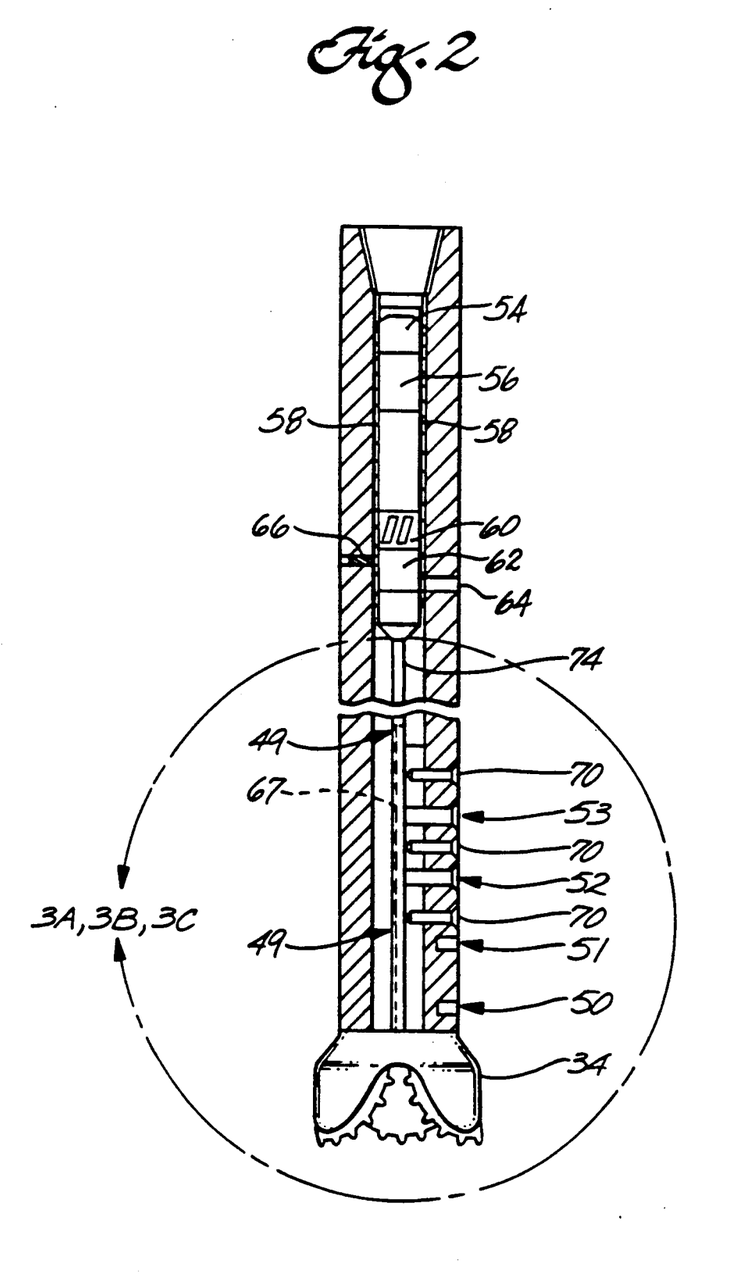
FIG. 2 is a longitudinal section of the logging portion of the drill collar at the lower end of the drill string.

As shown diagrammatically in FIG. 2, the logging tool 49 also includes a mud turbine 54 for extracting some energy from the flowing drilling mud, and a generator 56 for converting the rotational energy of the turbine 54 into electrical energy to supply power to the subsurface components (described below) in the logging tool.

Conventional wings or spiders 58 stabilize the turbine and generator inside the drill collar. A mud pulsing unit 60 receives power from the generator, and releases drilling mud from inside the drill collar to the annular space between the drill collar outside diameter and the well bore on command. This is accomplished by changing the state of a pulser valve 62 (FIG. 2) to allow drilling liquid to vent through an orifice 64 extending through the drill collar wall. When the valve opens, a portion of the drilling mud flows out through the orifice, and bypasses the pressure drop imposed on the drilling mud flowing through the drill bit jets (not shown). This causes the mud pressure at the surface to decrease below its normal operating value. When the valve closes, the drilling mud pressure at the surface returns to its normal condition. Thus, opening and closing the valve creates a negative pressure pulse at the surface. The pulsing valve and its associated driving equipment may be of any suitable type which causes a pressure pulse in the drilling mud of sufficient amplitude for detection at the surface. U.S. Pat. No. 4,351,037 to Scherbatskoy (1982) discloses a suitable valve for this purpose. U.S. Pat. No. 4,078,620 to Westlake et al (1978) discloses another system for generating pressure pulses in the drilling mud. If positive pulsing is desired, the pulser unit may be of the type disclosed in U.S. Pat. Nos. 2,925,251 to Arps (1960) or 3,958,217 to Spinnler (1976). The turbine, generator, and pulser valve are stabilized concentrically within the drill collar by the wings or spiders 58 and are secured from moving axially and rotationally by a bolt 66 threaded through the drill collar wall to fit into a threaded opening (not shown) in the portion of the logging tool which houses the pulser valve.

A subsurface electronic system 67 for processing and storing data is mounted in a fluid-tight electronics housing 68 secured against the inside wall of the drill collar by three vertically spaced socket head bolts 70. Mechanical and electrical connections are made from the electronics housing to the pulser valve unit by a hollow transition piece 74 (FIG. 2).

The subsurface electronics system in the electronics housing can be of any suitable type, such as that disclosed in U.S. Pat. No. 4,216,536 to More, which is incorporated herein by reference.

Figure 3A:
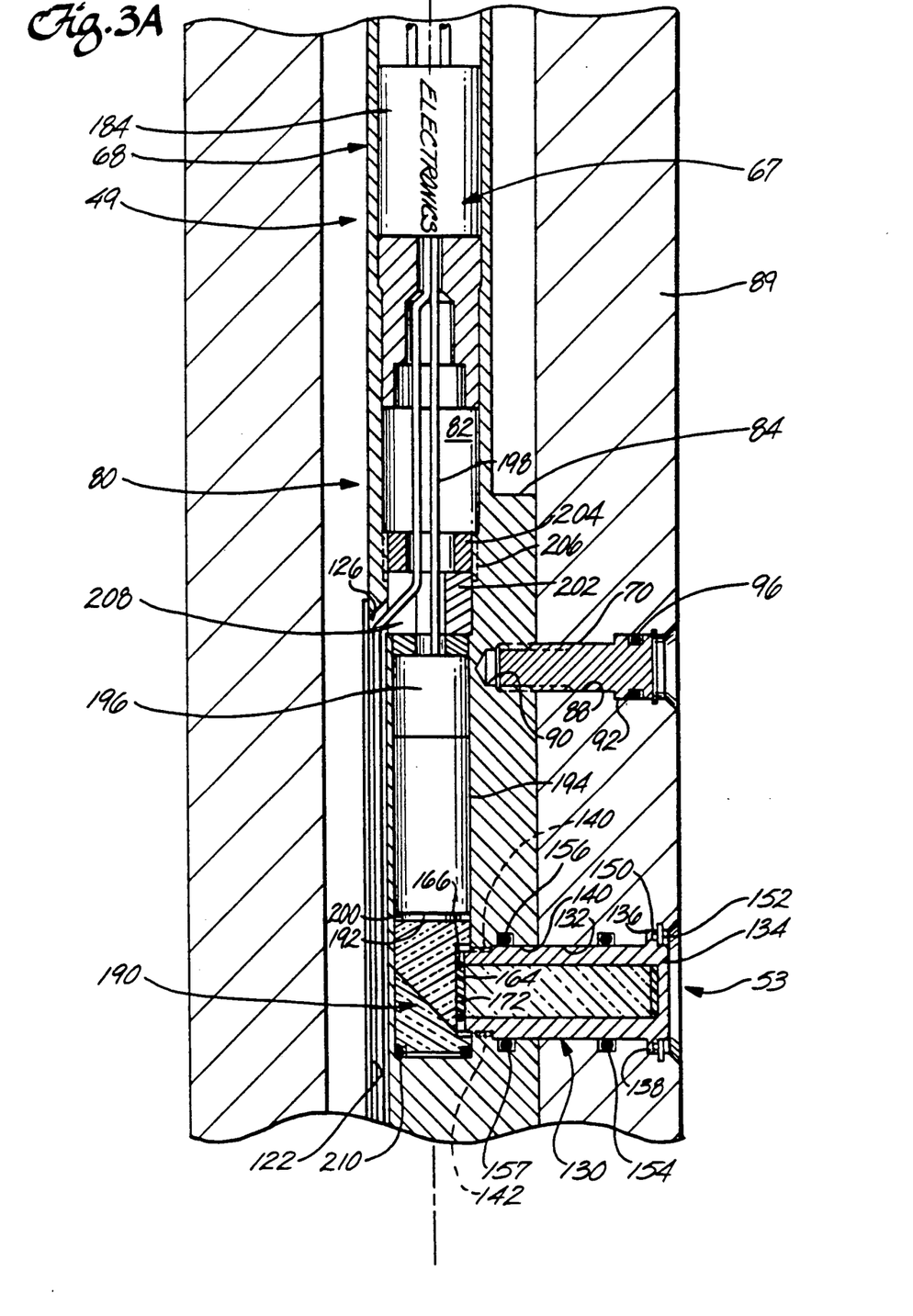
FIGS. 3A, 3B, and 3C are enlarged fragmentary views taken within the area of the arrows 3A, B, and C of FIG. 2.
Figure 3B:
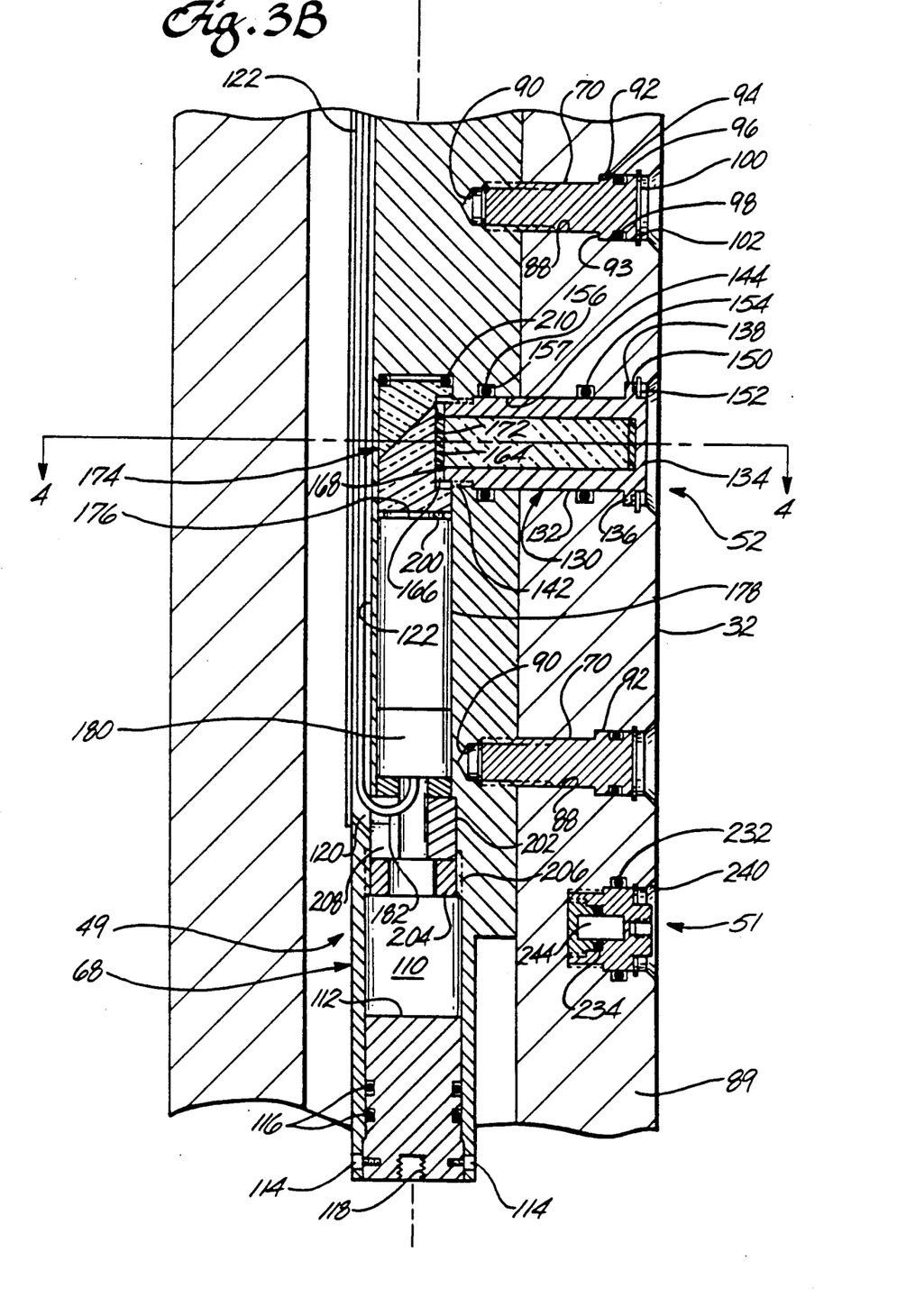

Referring to FIGS. 3A and 3B, the electronics housing 68 includes an elongated body 80 with an upper central longitudinal bore 82 located on the longitudinal axis of the drill collar in which the housing is mounted.

Figure 4:
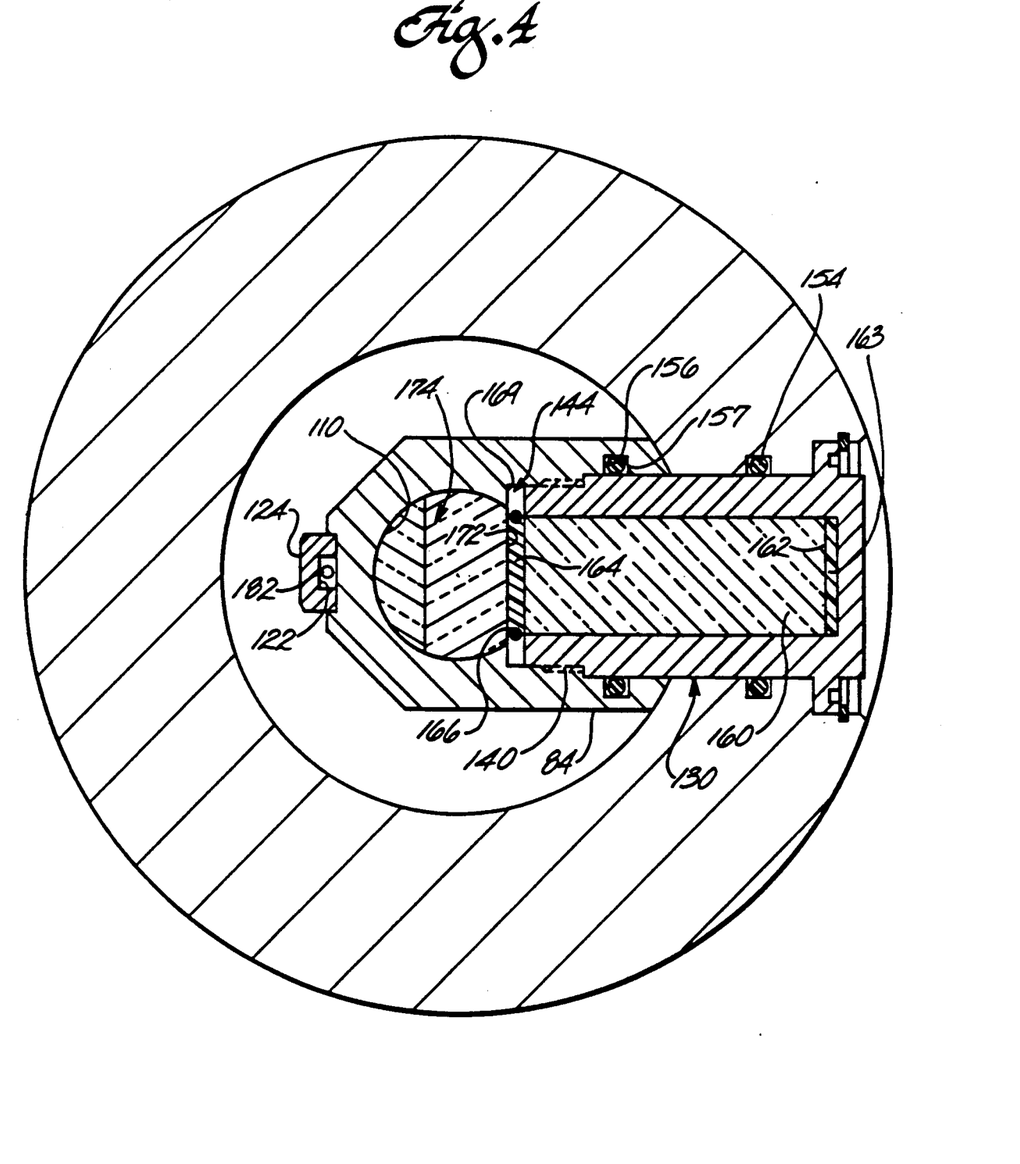
FIG. 4 is a view taken on line 4—4 of FIG. 3B.

A mounting block 84 formed integrally with the central portion of the electronics housing extends outwardly from one side of the housing. As shown in FIG. 4, the outer surface of the mounting block curves convex outwardly to match the curvature of the inside diameter of the drill collar. The three vertically-spaced socket head bolts 70 secure the electronics housing mounting block 84 against the interior surface of the drill collar wall. Each socket head bolt extends through a respective horizontal stepped bolt hole 88 through the drill collar wall 89. Each bolt hole is of decreasing diameter from its outer to its inner end. The inner end of each bolt threads into a respective internally threaded socket 90 in the exterior face of the mounting block. Each bolt includes a head 92 with an inwardly facing shoulder 93 which bears against an outwardly facing shoulder 94 at the outer end of the hole in which the bolt is disposed. A separate O-ring 96 in an outwardly opening channel 98 around each bolt head makes a fluid-tight seal against the respective bolt hole in which the bolt head is disposed. A separate C-shaped retaining ring 100 fits in a respective inwardly opening annular groove 102 at the outer end of each bolt hole, and bears against the outer surface of the bolt in the hole.

The O-rings 96 make a fluid-tight seal against the outer ends of the bolt holes to prevent drilling mud within the drill collar from leaking out to the drill collar exterior when the mud pumps are operated to create a higher pressure within the drill collar than outside. That pressure difference can be as high as several thousand pounds per square inch.

The electronics housing includes a lower vertical bore 110 on the longitudinal axis of the drill collar. The lower end of bore 110 is closed by a plug 112 locked in the lower end of bore 110 by socket head cap screws 114. A pair of O-rings 116 make a fluid-tight seal between the plug and lower end of the lower housing bore. The lower end of the plug 112 includes a downwardly opening and internally threaded recess 118 adapted to receive a threaded tool (not shown), which can be used to pull the plug from the lower bore 110 when servicing is required.

A laterally extending passage 120 (FIG. 3B) connects the upper end of lower bore 110 to a wire channel 122 formed within an elongated and longitudinally extending U-shaped strip 124 bonded (say, by welding) to the exterior of the electronics housing opposite from the side of the housing bolted against the interior of the drill collar wall.

The upper end of the wire channel opens through a lateral passageway 126 (FIG. 3A) into the lower end of the upper bore 82 of the electronics housing.

As shown in FIGS. 3B and 4, the lower scintillator 53 includes a stainless steel cylindrical scintillator case 130 which makes a close sliding fit in a case hole 132 extending radially through the drill collar wall. The outer end of the case includes an integrally-formed cap 134. An annular flange 136 on he cap rests on an outwardly facing shoulder 138 at the outer end of the case hole.

The inner end of the case includes external threads 140 threaded into an internally threaded socket 142 at the inner end of a case hole 144 extending through the electronics housing mounting block and into the upper end of the lower bore 110 of the electronics housing. Outwardly opening spanner wrench holes 150 in the outer surface of the case flange 136 receive a pin or spanner wrench (not shown) so the case can be screwed tightly into, or removed from, the threaded socket 142. A C-shaped retaining ring 152 in the outer end of the case hole through the drill collar keeps the case threaded snugly in the position shown in FIGS. 3B and 4. An O-ring 154 in an inwardly opening annular groove in the drill collar case hole makes a fluid-tight seal around the outer end of the scintillator case. An O-ring 156 in an inwardly opening annular groove 157 in the mounting block case hole makes a fluid-tight seal around the inner end of the scintillator case. The O-rings 154 and 156 prevent drilling mud from leaking through the drill collar hole or into the electronics housing. The O-ring 156 also causes the mounting block to be urged against the drill collar wall with a force equal to the area across the inner diameter of the O-ring times the pressure of the drilling mud in the drill collar.

A cylindrical scintillation crystal 160 (FIGS. 3A and 4) is disposed within the scintillator case. The outer end of the crystal includes a reflecting surface 162, which may be a white reflective material to reflect inwardly flashes of light formed within the crystal. An elastomer shock absorber 163 is between the outer end of the crystal and the inner face of the scintillator case cap.

The inner end of the crystal bears against the outer face of a disk 164 of transparent elastomer material molded within an O-ring 166.

The inner face of the elastomer disk bears against an outwardly facing surface 172 of a lower right-angle prism 174 mounted in the upper end of the lower bore 110 of the electronics housing so that light from the scintillation crystal is reflected 90° into the inlet end 176 of a lower elongated photomultiplier tube 178 (FIG. 3B), the lower end of which is connected to a first decoupling network 180, which decouples the signal from the high voltage applied to the photomultiplier tube. The signal passes through a cable 182 in the wire channel 122 to the electronics system in an electronics box 184 (FIG. 3A) in the upper end of the upper bore 82 of the electronics housing. The longitudinal axis of the photomultiplier tube substantially coincides with that of the drill collar.

A layer of optical silicone grease (not shown), which may be of the conventional type transparent to light, is between the outer face of the elastomer disk and the inner end of the scintillation crystal to improve light coupling and to reduce friction and avoid damage to the disk as the scintillator case 130 is screwed into the threaded socket 142 to the position shown in FIGS. 3B and 4. A layer of optical grease (not shown) is also preferably between the inner face of the elastomer disk and the outwardly facing surface 172 of the prism to improve light coupling between those two elements.

The elastomer disk may be of any suitable material transparent to the light generated in the scintillation crystal. Preferably, it is a clear, hydrophobic silicone elastomer which remains substantially solid at temperatures encountered in the well bore, e.g., up to 200° C.

For example, the cured solventless silicone resin potting compound sold by Dow Corning Corp. under the trademark "SYLGARD 184" (a platinum-catalyzed, polydimethylsiloxane, e.g., a vinyl-terminated, linear, dimethyl polysiloxane crosslinked with a silane-terminated, dimethyl polysiloxane), works well because it remains in place, even at high operating temperatures, and provides light coupling and shock mounting.

The upper scintillator 53 is mounted through the drill collar and electronics housing mounting block in a manner identical with that just described for the lower scintillator, and the detailed description of that construction is not repeated. However, like reference numerals are used for like elements in FIG. 3. The light output from the upper scintillator is connected through a similar light-coupling means to an upper right-angle prism 190, which turns the direction of the light 90° to be substantially parallel to the longitudinal axis of the drill collar so that the light enters the inlet end 192 of an upper elongated photomultiplier tube 194 disposed with its longitudinal axis substantially parallel to that of the drill collar longitudinal axis. The photomultiplier tube output is connected to a second decoupling network 196, which in turn is connected by a cable 198 to the electronics system.

Each photomultiplier tube is connected by suitable light-coupling means (such as optical grease, transparent elastomer disk, or the like) to its respective right-angle prism to transmit light with minimum loss. By using the right-angle prisms, the photomultiplier tubes can be mounted with their respective longitudinal axes substantially parallel with that of the drill collar, thus leaving maximum cross sectional area available for flow of drilling mud past the electronics housing. Bundles of fiber optics (not shown) could be used instead of the right-angle prism to change the direction of the light from the scintillators about 90° from a substantially radial to a substantially longitudinal direction.

Each photomultiplier tube is held in place by an annular spacer 202, which in turn is held in place by a lock nut 204 threaded into a respective internally threaded section 206 in the upper and lower bores 82 and 110. Each spacer includes a laterally opening slot 208 to permit the cable from the adjacent photomultiplier tube to pass into the wire channel. The adjacent ends of the right-angle prisms are cushioned against respective O-rings 210 at the inner end of the upper and lower bores 82 and 110, respectively.

Figure 3C:
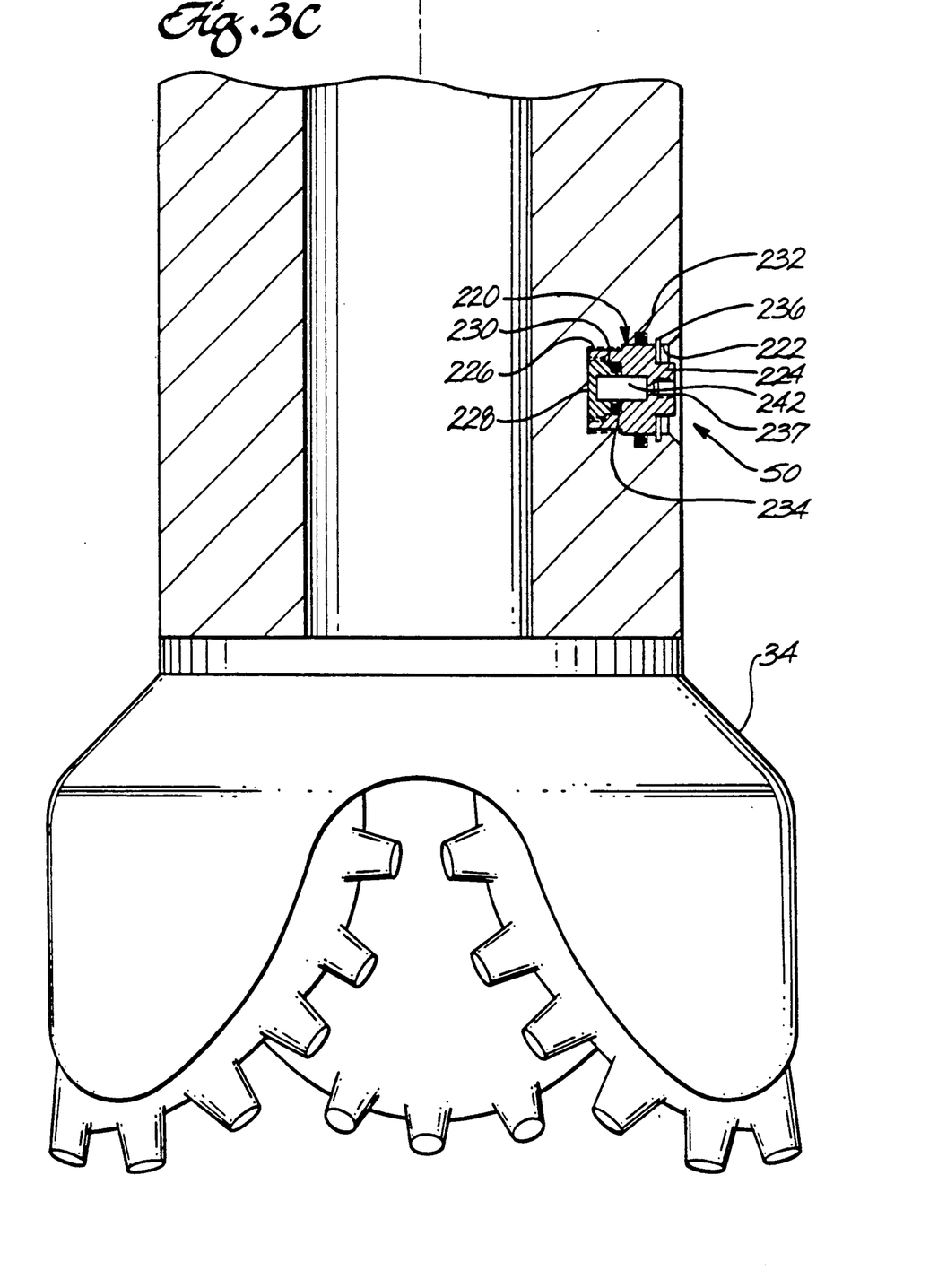

Referring to FIG. 3C, the first radioactive source 50 includes a rugged cylindrical stainless steel capsule 220 disposed in an outwardly opening cylindrical recess 222 in the drill collar wall. The outer end of the capsule is closed by a cap 224 formed integrally with the cylindrical sidewall of the capsule. The inner end of the cylindrical wall of the capsule is threaded externally into an internally threaded socket 226 at the inner end of the recess 222. The inner end of the capsule is closed by a plug 228 threaded around its periphery into an internally threaded socket 230 of the capsule. An O-ring 232 in an inwardly opening annular groove in the recess 222 makes a fluid-tight seal around the exterior of the cylindrical wall of the capsule. An O-ring 234 makes a fluid-tight seal between the cap 228 and the capsule cylindrical body. A retaining ring 236 at the outer end of the recess holds the capsule in place.

An internally threaded, outwardly opening socket 237 in the capsule facilitates insertion and removal of the capsule in the recess 222.

The upper radioactive source 51 is mounted in an outwardly facing recess 240 in the drill collar wall in a manner identical with that for the lower radioactive source.

A first body 242 of radioactive material is sealed within the capsule of the lower source, and a second body 244 of radioactive material is sealed within the capsule of the upper radioactive source.

The radioactive materials in each source can be of any suitable type. For example, in running a gamma ray-gamma ray log to determine the density of the adjacent formation, the presently preferred source of gamma rays is cesium-137. For neutron logging, say, to determine porosity, the preferred source of neutrons is californium-252, because of its relatively high specific activity. Americium-241/beryllium can also be used as a neutron source, but it has a lower specific activity than californium-252. Two possible sources may be used, a radioactive source and a Gamma ray source.

The capsules for the radioactive sources are preferably made of stainless steel and are designed to withstand pressures in excess of 20,000 psi. The scintillator cases are also designed to withstand pressures greater than 20,000 psi, and may also be made of stainless steel, but preferably are made of titanium because it provides high strength and low density for better gamma ray detection.

The scintillators can be of any suitable type, depending on the type of radiation to be detected. For example, in running a natural gamma ray log (in which case no radioactive source is required), or a gamma ray-gamma ray log (which would require a source of gamma rays)to determine the density of a formation, the presently preferred scintillator includes a cesium iodide crystal activated with sodium or thallium. The cesium iodide is a rugged scintillator noted for high gamma ray stopping power and resistance to thermal and mechanical shock.

For detecting epithermal neutrons (say, for neutron porosity logging), the preferred scintillator includes cerium-activated lithium silicate glass. The elastomer shock absorber at the outer end of the scintillator crystal may also include a layer (not shown) of material, such as cadmium, to capture thermal neutrons arising from the formation, and to convert epithermal neutrons to thermal neutrons for capture in the cerium-activated lithium silicate glass.

Figure 5:
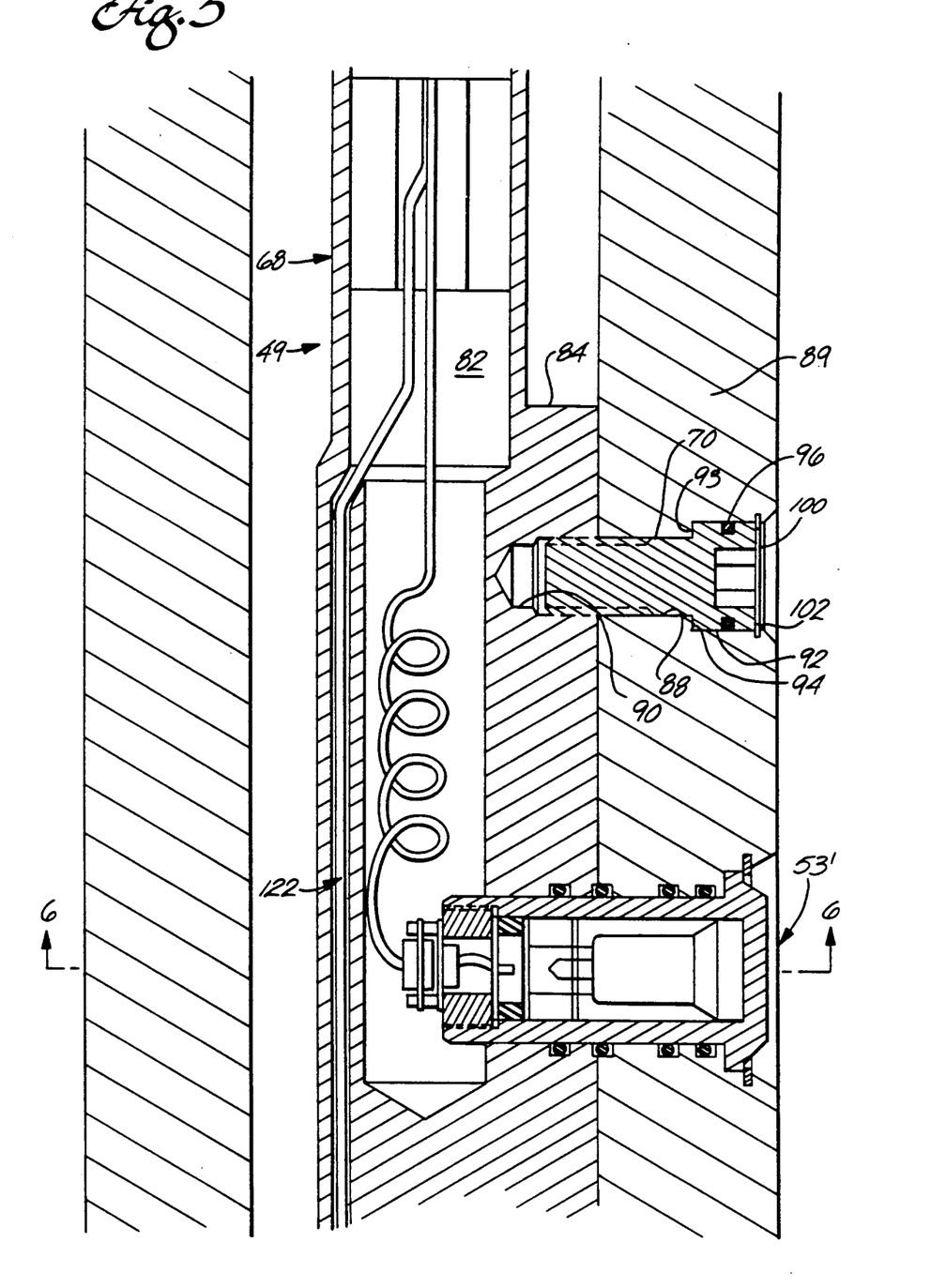
FIG. 5 is an enlarged fragmentary view of the same portion of FIG. 2 as that shown in FIG. 3A, incorporating a radial in-line embodiment of the scintillator and photomultiplier tube.
Figure 6:
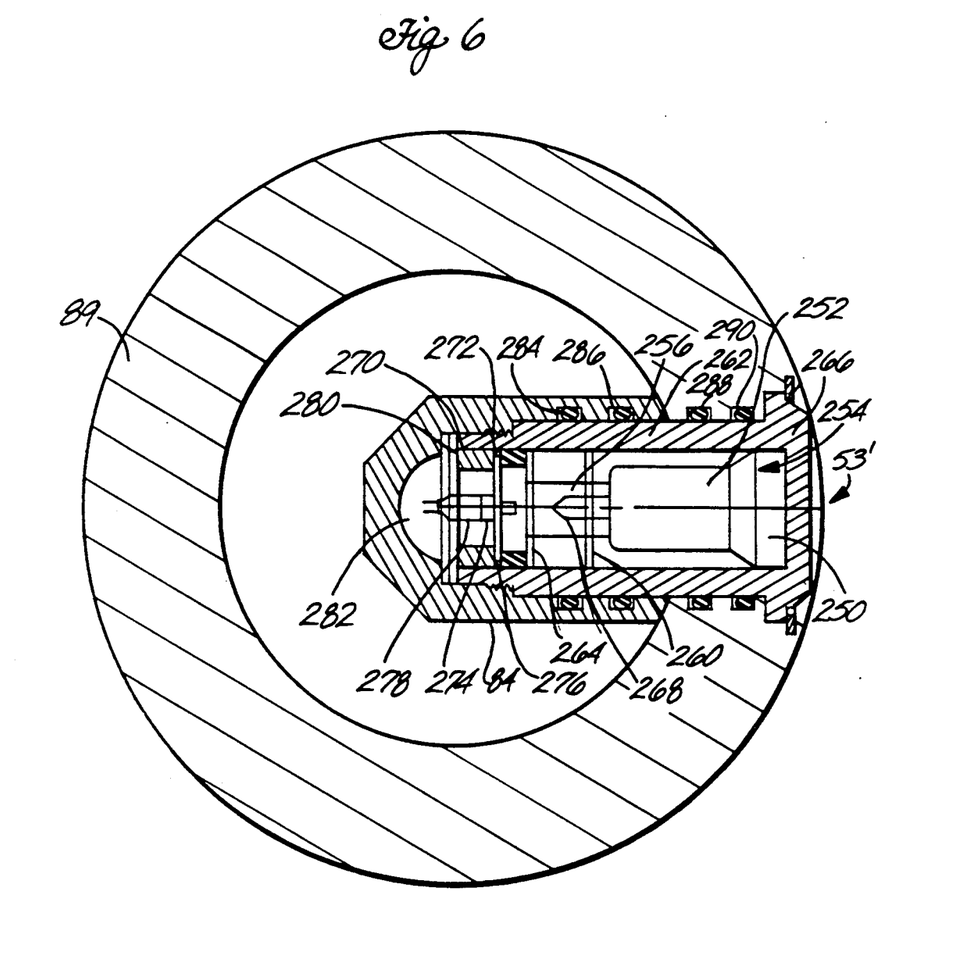
FIG. 6 is a view taken on line 6—6 of FIG. 5.

FIGS. 5 and 6 disclose, an alternate embodiment of the invention which employs a scintillator and photomultiplier tube in alignment in a single case extending radially through the wall of the drill collar. The scintillator unit 53' includes a lithium glass scintillator 250 connected to a photomultiplier tube 252 through a frusto-conical light guide 254. In the arrangement shown in FIGS. 5 and 6, the lithium glass scintillator is of greater diameter than the photomultiplier tube. The frusto-conical light guide allows the use of the larger diameter scintillator which in turn provides greater sensitivity for neutron detection. As presently implemented, the scintillator is $Li^6$ glass, however, the detector may be implemented using sodium iodide (NaI) or other appropriate material. The detector shown in the drawings is a thin lithium glass detector using, for example, a NP-style detector produced by Bicron or equivalent. The photomultiplier tube employed in the embodiment shown is produced by Hammamatsu.

As shown in FIG. 6, a raw photomultiplier tube is employed with leads 256 extending from the inner end of the photomultiplier tube. A vacuum pinch-off tube 258 for the photomultiplier tube is shown. A dynode resistor board 260 with apertures to accommodate the photomultiplier tube leads and vacuum pinch-off is employed for mounting biasing resistors for attachment to the leads of the photomultiplier tube. The use of this resistor board provides improved structural mounting of the resistors and may employ printed circuit board techniques for solder attachment to the leads. The configuration shown with the leads extending through the resistor board provides for mechanical spacing of the leads and lateral structural support for the photomultiplier tube within the case 262.

A termination board 264 is connected to the termination of the photomultiplier tube leads. The termination board also provides the structural termination of the detector assembly comprising the scintillator, light guide, photomultiplier tube, dynode resistor board and termination board. The case is closed by a machined boss 266 which constrains the detector assembly at the outer end of the case while a rubber spacer ring 268 in combination with a jam nut 270 and a force plate 272 constrain the inner end of the detector assembly in the case. A triaxial electrical connector is employed with the male portion of the connector 274 attached to the force plate and electrically connected to the termination board. An indexing pin 276 on the force plate prevents rotation of the force plate and connector half with respect to the case. The female portion 278 of the triaxial connector is connected to a catch plate 280 which is held in slots in the connector block 84. Orientation of the female connector is therefore established and held rigid by the catch plate while the male half of the connector is secured from rotation by the pin in the case of the scintillator assembly.

The boss 266 is of greater diameter than the remainder of the case and engages a shoulder 138 in the hole through the drill collar. Threads 281 on the inner end case engage mating threads in the receiving hole in the mounting block of the electronics housing. Fabrication of the scintillator assembly can be completed and the entire unit inserted through the collar wall. Rotation of the case draws the threads into the mounting block and engages the mating halves of the connector. Tightening of the threads draws the boss against the shoulder of the hole in the drill collar and urges the mounting block of the electronics housing firmly against the inner diameter of the drill collar wall. The configuration of the case shown in FIGS. 5 and 6 may in some cases replace or supplement the socket head bolts securing the electronics housing to the drill collar.

A bore 282 in the connector block provides a passage for wires from the female connector to the electronic components in the electronics housing.

The assembly of the scintillator, light guide and photomultiplier tube in the case is accomplished by attachment of the scintillator to the light guide and the light guide to the photomultiplier tube with optical epoxy or other suitable adhesive. An overwrap of tetrafluoroethylene tape (marketed under the trademark Teflon) is made of the diametrical surfaces of the scintillator, light guide and photomultiplier tube as a reflector as known to those skilled in the art. A cadmium layer may be applied over the tetrafluoroethylene tape for shielding the detector assembly from thermal neutrons. The desired sensitivity of the detector for thermal neutrons, epithermal neutrons or gamma rays will determine whether application of the cadmium layer is required.

The dynode resistor board is inserted over the photomultiplier tube leads and solder connections are made. The termination board is then connected to the photomultiplier tube leads. The scintillator and photomultiplier tube assembly, or detector assembly, is then inserted into the case and the rubber spacer, force plate and jam nut installed.

The void area in the case after insertion of the detector assembly may be filled with a potting material for shock dampening and lateral structural support. Those skilled in the art will recognize that the detector assembly may be potted prior to insertion into the case. The jam nut is drawn tight against the force plate to resiliently constrain the detector assembly within the case through the rubber spacer. The scintillator assembly may then be inserted in the drill collar engaging the mating connectors and secured with a snap ring 152 to prevent the assembly from rotating out of the drill collar. O ring seals between the case and the mounting block 284 and 286 and between the case and the drill collar wall 288 and 290 seal the case in the drill collar and mounting block as previously described. Double O ring seals as shown in FIGS. 5 and 6 or single O ring seals as shown in the previous embodiments may be employed.

The embodiment as shown provides intimate connection between the lithium glass scintillator and the photomultiplier tube for maximum sensitivity. Detection amplification is achieved through the larger diameter scintillator connected to the smaller diameter photomultiplier tube through the frusto conical light guide. A single case enclosing the detector assembly as a whole provides an integral pressure tight assembly between the drill collar case and mounting block precluding leakage of drilling fluid from inside or outside of the drill collar. As previously described, this configuration urges the electronics housing and mounting block against the drill collar wall under the hydrostatic pressure of the drilling fluid in the collar.

FIG. 5 demonstrates the arrangement of the upper scintillator installation, a lower scintillator installation identical in configuration is located downwardly on the drill collar as described for the prior embodiments. Those skilled in the art will recognize that the configuration of the bore 282 for electrical wires may be extended between the two scintillators to avoid the requirement for a separate wire channel 122 as described for the previous embodiments and as shown in FIG. 5. The embodiment shown in FIG. 6 eliminates the second channel. Structural considerations in the electronics housing and mounting block determine the design employed.

As will be appreciated from the foregoing description, this invention provides radioactivity logging apparatus in which a scintillator or scintillators for detecting radioactivity are located in the exterior portion of a drill collar wall for maximum sensitivity and to minimize the effect of drilling mud and drilling mud filter cake. Moreover, each scintillator and radioactive source, when used, can easily be removed for inspection or replacement at the well site and without requiring dismantling of the interior of the logging apparatus. The same is true for the capsules of radioactive material.

What is claimed is:

1. In a well drilling apparatus which includes a hollow drill string in the well, a rotatable drill bit on the lower end of the drill string and means for circulating drilling liquid through the drill string, the improvement comprising:
- a section of drilling collar having an annular wall mounted in the drill string in the vicinity of the drill bit, the drill collar wall having a hole extending therethrough;
- a detector assembly having a scintillator and a photomultiplier tube aligned radially with respect to the drill string and mounted to expose the scintillator through the hole in the drill collar;
- an electronics housing disposed within the drill collar and arranged to permit drilling liquid to flow past it; and
- a case enclosing the detector assembly sealingly engaging the drill collar wall and the electronics housing.

2. An apparatus according the claim 1 wherein the detector assembly comprises a lithium glass crystal of a first diameter and the photomultiplier tube is of a second lesser diameter, and further comprising frusto-conical light coupling means interconnecting the lithium glass crystal and the photomultiplier tube.

3. An apparatus as defined in claim 1 wherein the case engages the electronics housing with a first sealing means and engages the drill collar wall in the hole therethrough with a second sealing means.

4. An apparatus according to claim 3 wherein the electronics housing includes a hole therethrough, the case extends through the hole in the electronics housing with the first sealing means engaging the case and a wall of the hole through the electronics housing whereby the pressure of the drilling mud within the drill collar urges the housing toward the drill collar wall.

5. An apparatus according to claim 4 wherein the case has a threaded inner end for mating engagement with threads in the wall of the hole in the electronics housing and wherein the case includes means engaging the drill collar for resisting radial inward movement with respect to the longitudinal axis of the drill collar and the case further includes means constraining the detector assembly within the case.

6. An apparatus as defined in claim 5 wherein the engaging means comprises a boss on an outer end of the case, the boss having greater diameter than the case and engaging a shoulder in the hole through the drill collar wall.

7. An apparatus according to claim 4 wherein the case has a threaded inner end for mating engagement with threads in the wall of the hole in the electronics housing and the case further includes a boss constraining the detector assembly within the case and engaging the drill collar at a recessed shoulder in the hole through the collar whereby the case acts as a structural connector attaching the electronics housing to the drill collar wall and resisting relative movement between the electronics housing and drill collar wall in a direction with a component parallel to the longitudinal axis of the drill collar.

8. An apparatus as defined in claim 7 wherein the photomultiplier tube has a plurality of leads and said detector assembly further comprises spacing for engaging the plurality of leads to maintain separation and alignment there between and means resiliently engaging the spacing means to urge the detector assembly against the boss of the case.

9. An apparatus as defined in claim 8 wherein the spacing means comprises:
- a first board received within the case and having a plurality of apertures spaced to receive the leads, the first board located distal the inner end of the case,
- a second board received within the case and having a plurality of apertures to receive the leads, the second board located proximate the inner end of the case, and,
- means for securing the leads within the apertures of the first and second boards.

10. An apparatus as defined in claim 9 wherein the resiliently engaging means comprises:
- a jam nut threadably received within the inner end of the case;
- a force plate engaged by the jam nut; and
- a rubber spacer ring intermediate the force plate and the second board whereby threadably tightening the jam nut urges the force plate against the rubber spacer which in turn resiliently urges the second board and attached leads toward the boss of the case constraining the detector assembly between the boss and jam nut.

11. An apparatus as defined in claim 10 further comprising shock absorbing potting material filling voids between the detector assembly and case.

12. An apparatus as defined in claim 11 wherein the securing means for the leads to the first and second boards comprises solder connection of the leads to printed circuit pads on the surface of the boards, and wherein the detector assembly further comprises a compensating resistor network attached to the first board for interconnection between appropriate leads of the photomultiplier tube.

13. An apparatus as defined in claim 12 further comprising an electrical connector having a first moiety attached to the force plate and electrically connected to the detector assembly and a second moiety supported within the electronics housing for mating engagement.

14. An apparatus as defined in claim 13 wherein the first and second sealing means each comprise a O ring.

* * * * *

UNITED STATES PATENT AND TRADEMARK OFFICE
CERTIFICATE OF CORRECTION

PATENT NO. : 5,061,849

DATED : October 29, 1991

INVENTOR(S) : J.E. Meisner; E.S. Mumby; V.E. Groeschel

It is certified that error appears in the above-identified patent and that said Letters Patent is hereby corrected as shown below:

Column 6, line 2, change "on he" to -- on the --.

Column 8, line 48, after "disclose" delete the comma.

Column 9, line 60, before "tape" insert -- (TFE) --.

Signed and Sealed this

Twentieth Day of April, 1993

*Attest:*

MICHAEL K. KIRK

*Attesting Officer*  *Acting Commissioner of Patents and Trademarks*